United States Patent [19]

Heiskanen

[11] Patent Number: 4,727,218

[45] Date of Patent: Feb. 23, 1988

[54] PROCEDURE AND MEANS FOR SEPARATING OR PURIFYING ORGANIC SUBSTANCES

[75] Inventor: Tomi Heiskanen, Helsinki, Finland

[73] Assignee: Neste OY, Finland

[21] Appl. No.: 751,549

[22] Filed: Jul. 3, 1985

[30] Foreign Application Priority Data

Jul. 4, 1984 [FI] Finland .................................. 842699

[51] Int. Cl.$^4$ ............................................... C07C 7/14
[52] U.S. Cl. ..................... 585/815; 585/816; 23/296; 210/774; 210/179; 422/245; 422/251
[58] Field of Search ................ 422/245, 251, 254; 23/296, 297; 210/774, 804, 179; 585/812, 815, 816

[56] References Cited

U.S. PATENT DOCUMENTS

| 2,321,117 | 8/1943 | Wilcock | 422/251 X |
| 2,830,104 | 4/1958 | Speckhardt et al. | 585/815 |
| 3,598,873 | 8/1971 | Bloch | 23/296 |

FOREIGN PATENT DOCUMENTS

| 1519817 | 2/1969 | Fed. Rep. of Germany . |
| 2057445 | 8/1972 | Fed. Rep. of Germany . |
| 2214481 | 10/1973 | Fed. Rep. of Germany . |
| 971396 | 11/1982 | U.S.S.R. . |
| 980748 | 12/1982 | U.S.S.R. . |

Primary Examiner—Andrew H. Metz
Assistant Examiner—Glenn A. Caldarola
Attorney, Agent, or Firm—Steinberg & Raskin

[57] ABSTRACT

Method and apparatus for separating and/or purifying a substance from a molten mixture by crystallization, in which the molten mixture is conducted into an annular space defined by two substantially curvilinearly-shaped surfaces, one of the surfaces being cooled, and at least one of the surfaces rotating. The molten mixture is thereby cooled as the same flows through the annular space with material crystallizing to form a deposit upon the cooled surface. The crystallized deposit is then caused to be contacted by a source of heat, whereby the same is melted. At least part of the melted deposit is then removed from the annular space, to obtain the substance in purified form, while any remaining part of the melted deposit is conducted through the annular space in a direction away from the source of heat. Non-crystallized molten material which contains impurities is also removed from within the annular space.

25 Claims, 5 Drawing Figures

PROCEDURE AND MEANS FOR SEPARATING OR PURIFYING ORGANIC SUBSTANCES

BACKGROUND OF THE INVENTION

The present invention is directed to a method for separating or purifying a substance to be separated/purified by crystallizing onto a cool surface from a molten mixture. The present invention is also directed to an apparatus for separating and/or purifying such a substance, with crystallization of the substance to be separated/purified from a mixture in a molten state taking place on a cooled surface in this apparatus.

Purifying or separating organic substances by crystallization from a molten mixture of the substances, has been very well known. The attainable efficiency of such separation can be determined from a phase diagram of the mixture of the substances in question. Most commercial melt-crystallizing processes make use of indirect cooling. The heat to be removed is then transferred through a partition, for instance, through a tube wall, to the coolant.

Crystallization may take place either in suspension or directly onto the cooled surface. A batch-type crystallizer is most usually involved in the latter case, where the accumulating crystallized deposit is removed by melting. Thus no new mixture to be crystallized can be introduced into the same apparatus at the same time. However, continuously operating crystallizers are also known, which are provided with cooling, melting and mixing apparatus. Examples of rotating melt crystallizers may be found, for example, in German patents Nos. 2,214,481 and 2,057,824.

A cylinder crystallizer is disclosed in German patent No. 2,214,481 in which the crystallizing space consists of the lowermost part of an annular space between two rotating cylinders, one inside the other. Both cylinders rotate about a horizontal axis. Melt to be treated is conducted into the annular space between the cylinders, this melt being crystallized at the lowermost point of the annular space to form a plug with the aid of coolers disposed outside the annular space. The crystallizing surface of the plug is continuously flushed by a flow of the melt being treated, while at the same time non-crystallizing components of the mixture and impurities are removed from the melt with the aid of a pipe extending into the annular space.

SUMMARY OF THE INVENTION

Accordingly, it is an object of the present invention to improve separation and/or purification of substances by crystallization.

It is also an object of the present invention to provide for both effective batch and continuous crystallization for separation and/or purification of substances.

It is another object of the present invention to provide for better control of crystallization and/or purification of substances.

It is a further object of the present invention to provide for increased capacity of crystallization in the separation and/or purification of substances.

These and other objects are provided by the present invention, which is directed to a method for separating and/or purifying a substance from a molten mixture by crystallization. The molten mixture is conducted into an annular space defined by two substantially curvilinearly-shaped surfaces. One of these surfaces is cooled, and at least one of the surfaces rotates. The molten mixture is thus cooled on the cooled surface, as the mixture flows through the annular space. Material crystallizes to form a deposit on the cooled surface.

The crystallized deposit on the cooled surface is then contacted by a source of heat and melts. At least part of the melted deposit is removed from the annular space, to obtain the substance in purified form. Any remaining part of the melted deposit is conducted through the annular space in a direction away from the source of heat. Noncrystallized, molten material which contains impurities, is also removed from the annular space.

The present invention is also directed to an apparatus for separating and/or purifying a substance by crystallization from a molten mixture. The apparatus comprises a first curvilinearly-shaped surface which is adapted to rotate, and a second curvilinearly-shaped surface. One of these two surfaces is cooled. An annular space is defined between the two surfaces, with means for introducing molten mixture to be separated and/or purified into the annular space, being provided. Means are also provided for cooling the surface to be cooled, whereby material crystallizes as a deposit upon the cooled surface.

A source of heat for melting the crystallized deposit is also provided, along with means for removing at least a portion of the melted deposit from the annular space, to obtain the substance in purified form. Additionally, means for removing molten, non-crystallized material which contains impurities from within the annular space, are also provided.

The present invention concerns a new procedure for separating and/or purifying organic substances, in which better purification efficiency and controllability of crystallization are achieved, as compared with prior technology. The method of the present invention operates equally well as a batch process, or as a continuous process. The present invention also concerns an apparatus, i.e., a cylinder crystallizer, in which the method of the present invention is applied. Better efficiency and controllability are also achieved with the apparatus of the present invention, i.e., a cylinder crystallizer, which has substantially greater capacity than any crystallizer of the prior art. The cylinder crystallizer of the present invention can operate both as a batch crystallizer, or as a continuous action crystallizer.

In the procedure and apparatus of the present invention for separating and/or purifying a substance from a mixture in the molten state, in which the substance to be separated or purified crystallizes upon a cooled surface, the initial mixture in a molten state is conducted at an infeed point into an annular space defined by a rotating cylindrical shell surface, which in turn is cooled, and by another cylindrical shell surface spaced therefrom. The substance to be separated or purified crystallizes upon the surface of the rotating, cooled shell to form a deposit which in turn is melted at a first removal point located downstream from the infeed point in the direction of rotation of the cooled shell surface.

At least part of the melted, purified substance is removed at this location, with any remaining part being conducted in a return flow back along the annular space. Impure substance mixture is conducted out at a second removal point located upstream from the infeed point with respect to the direction of rotation of the cooled shell surface.

An important feature of the present invention is that an appropriate temperature gradient is established between the purified material removal point and the impure material removal point. Another important feature is the counterflow of the crystallized and remelted material, along the crystallized deposit upon the cooled, rotating shell surface, with its concomitant flushing effect.

Consequently, the present invention affords numerous advantages. Nearly all of the surface area of the rotating shell surface is available for crystallizing. In the prior art, only part of the shell surface had been used for crystallizing. Another advantage of the present invention, is that the crystallizing begins at the point where the impurity of the melt is the greatest. The thickness of the crystallized deposit increases in the direction of rotation of the drum towards the purified material removal point, where the crystallized deposit has the greatest thickness. This means that the greater part of the crystallized material crystallizes at a point where the melt has greater purity. Therefore, the purification effect of the present invention is substantially superior to any of the prior art.

As noted above, the present invention is also directed to an apparatus for applying the method thereof. The apparatus of the present invention provides for separating and/or purifying organic substances by crystallization taking place upon a cooled surface, from a mixture of the substances to be separated. In the apparatus of the present invention, a first rotating, substantially cylindrically-shaped shell surface which can be cooled is provided, along with a second, substantially cylindrically-shell surface that is spaced from the first shell surface. An annular space between the first rotating shell surface and the second shell surface is thus defined.

Members for removing purified substance crystallized upon the surface of the rotating, cooled shell upon remelting are provided at a point located, in the direction of rotation of the rotating, cooled shell surface, downstream from the point where the molten substance mixture to be treated is introduced. Members are also provided for removing a mixture of impure substances from the annular space at a point located upstream of the point where the material to be treated is introduced with respect to the direction of rotation of the cooled, shell surface.

Additionally, members for conducting the substance to be treated in a molten state into the annular space are provided, along with members for cooling the rotating shell surface and members for melting the purified, crystallized deposit close to the removal point for the pure substance.

BRIEF DESCRIPTION OF THE DRAWINGS

The invention will be further described in greater detail with reference to certain preferred embodiments thereof illustrated in the accompanying drawings, to which the present invention is not intended to be exclusively confined. In the drawings, FIG. 1. is a top view of one embodiment of the apparatus and method of the present invention.

DESCRIPTION OF THE PREFERRED EMBODIMENTS

Figure 1:
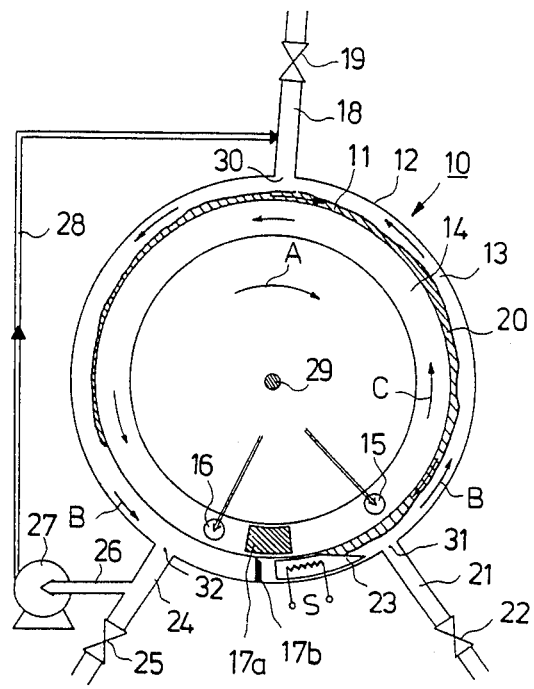

Referring to FIG. 1, the apparatus of the present invention is generally indicated by the reference numeral 10. In the embodiment illustrated in FIG. 1, the apparatus 10 comprises a rotating, cylindrical shell surface 11, and another cylindrical shell surface 12 spaced therefrom, these shell surfaces 11, 12 defining an annular space 13 therebetween. The shell surface 11 is cooled with a cooling jacket 14, into which cooling liquid is conducted by a supply pipe 15. The cooling water is removed from the cooling jacket 14 through a drain pipe 16. An insulating partition 17a is provided in the cooling jacket 14, for guiding the cooling liquid. Two or more equivalent insulating walls 17a may naturally be provided. An insulating plate or separator 17b is provided in the annular space 13. The plate or separator 17b has been fitted with friction contact so that it remains stationary within the annular space 13.

The apparatus 10, additionally comprises a feed line 18 with valve 19, a pure product output line 21 with valve 22, and an impure product outpout line 24 with valve 25. The deposit of melt that has solidified in the annular space 13 upon the surface of shell 11, has been indicated by reference numeral 20. A heater element 23, which is preferably an electrical resistance connected to source S has been disposed in the annular space 13 as illustrated. The heater element 23 may also replace the separator or insulator plate 17b altogether.

Part of the impure product may be conducted from the impure product output line through a branch line 26 and to circulating means 27, e.g. a pump, which is disposed to conduct part of the impure product through a return line 28, to the melt supply line 18. Reference numeral 29 indicates a vertical axis of rotation about which the cylindrical shell surface 11 has been disposed to rotate. The rotating cylindrical shell 11 and the second cylindrical shell 12 may be disposed substantially concentrically with one another. Alternatively, these two surfaces may be eccentrically disposed in relation to one another, as required.

The direction of rotation of the cylindrical shell surface 11, also the direction of movement of the substance that has solidified/crystallized upon the shell surface 11, has been indicated by arrow A in FIG. 1. The direction in which the returning melt moves has been indicated by arrow B in FIG. 1, while the direction in which any cooling liquid moves through the cooling jacket 14 has been indicated by arrows C in this figure. In FIG. 1, the melt input point has been indicated by reference numeral 30, the pure product removal point has been indicted by numeral 31, and the impure product removal point has been indicated by numeral 32.

In the embodiment of the present invention illustrated in FIG. 1, the mixture of substances to be separated/purified in the molten state is conducted into the annular space 13 through the infeed point 30. The annular space 13 is bordered by the rotating cylindrical shell surface 11 which is cooled, and by the other cylindrical shell surface 12 spaced therefrom. With the shell surface 11 rotating in the direction indicated by arrow A, the substance to be purified/separated is crystallized upon the surface of the rotating, cooled shell 11, to form the crystallized deposit 20.

The crystallized deposit 20 is then remelted at or near the first removal point 31, which is located downstream from the infeed point 30 in a direction of rotation A of the cooled shell surface 11. At least part of the melted purified material is removed through the first removal point 31 and along the removal line 21. The remainder of the melted, purified material is then conducted in the form of a return flow B back along the annular space 13. The mixture of impure molten substance is conducted off at the second removal point 32, which is located upstream of the infeed point 30 with respect to the direction of rotation A of the cooled shell surface 11.

The fluid cooling the shell surface 11 is introduced into the cooling jacket 14 from the pipe 15 at a point which is close to the purified material removal point 31, as illustrated in FIG. 1. The cooling fluid is conducted out from the cooling jacket 14 and into the drain pipe 16, at a point which is close to the impure material removal point 32, as also illustrated in this figure. A separator, such as an insulating plate 17b, for example, is disposed between the purified material removal point 31 and the impure material removal point 32, which prevents the flow of molten material between these two removal points 31, 32 in the direction of arrow A, and also prevents any flow of molten material past point 32 to point 31, as illustrated in FIG. 1 (i.e. in a direction which bypasses the introduction point 30).

Crystallizing is accomplished on the outer surface of the rotating cylindrical shell surface 11 as illustrated in the embodiment of FIG. 1. Crystallization can also naturally be accomplished along the inner surface of the rotating cylindrical shell surface 11, in which case the cooling jacket 14 will naturally be disposed upon the outside of the shell surface 11, and the shell surface 12 will be disposed inside the shell surface 11. The cooled cylindrical shell surface 11 has been disposed to rotate about a vertical axis of rotation 29, in the embodiment of FIG. 1.

Figure 2:
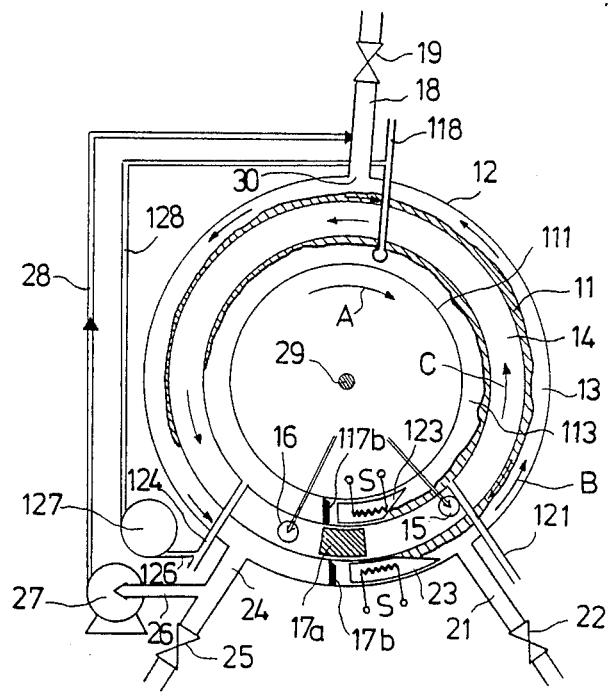
FIG. 2 is a top view of another embodiment of the apparatus and method of the present invention.

The embodiment illustrated in FIG. 2 is similar to the embodiment illustrated in FIG. 1, with an additional cylindrically-shaped shell surface 111 being disposed inside the rotating shell surface 11, and also inside the cooling jacket 14, as illustrated in this embodiment. Annular spaces 13 and 113 are thus both formed, as illustrated in FIG. 2. These annular spaces are each provided with respective members 21, 22, and 121 as illustrated for removing purified substance, while also being provided with respective members 24, 25, and 124 as illustrated, for removing impure substances. Respective members 18, 19 and 118 are provided for conducting the mixture to be purified or separated in the molten state into the concomitant annular passages, 13, 113.

Additionally, the annular space 113 in the embodiment of FIG. 2 is also provided with a separator or partition 117b dividing the annular space 113 similar to partition 17b in the annular space 13. Each respective annular space, 13, 113, is provided with the respective members for removing purified substances, for removing impure substances, and for introduciing substances to be purified, as noted above and as clearly illustrated in FIG. 2. Additionally, reference numeral 124 indicates a second output line, for removing the impure substance from within the inner annular space 113. Reference numeral 126 indicates an additional branch line with reference numeral 127 indicating circulation means, e.g. a second pump 127, for recirculating at least a portion of the impure substance removed from the inner annular space 113 back thereto along a second return line 128 which communicates with the additional molten feed line 118.

In other respects, the functioning of the embodiment illustrated in FIG. 2, is analogous to the functioning of the embodiment illustrated in FIG. 1. It is clear that any desired number of shell structures inside one another may be provided in accordance with the present invention, whereby a plurality of purifying spaces can be connected in series or in parallel, and different purifying spaces can be used to purify different types of substances, provided that the crystallization temperatures of the substances so permit. In any event, utilization of several purifying spaces improves the purifying capacity.

Figure 3:
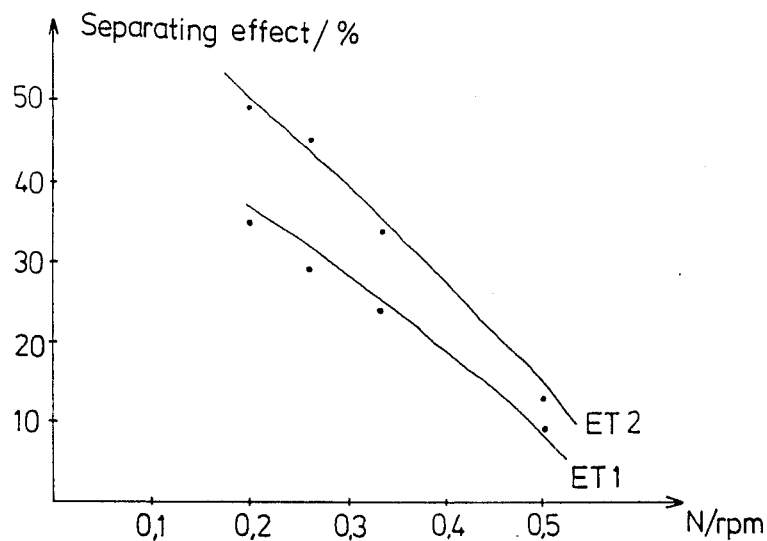
FIG. 3 is a graphical illustration of the separating efficiency of the apparatus and procedure of the present invention, with respect to the speed of rotation of the shell surface.

The separation effect of the apparatus and method of the present invention is illustrated in FIG. 3 in percent over the speed of rotation. The substance to be purified is a naphthalene/$\beta$-methylnaphthalene mixture containing 95 percent naphthalene. The purifying efficiency ET1 in FIG. 3, has been determined by the formula $(W_{START} - W_{PURIFIED})/W_{START} \times 100\%$, while the purifying efficiency ET2 plotted in FIG. 3, has been determined by the formula $(W_{UNPURIFIED} - W_{PURIFIED})/W_{UNPURIFIED} \times 100\%$, with the value W being the concentration of impurities in the melt in percent by weight.

Figure 4:
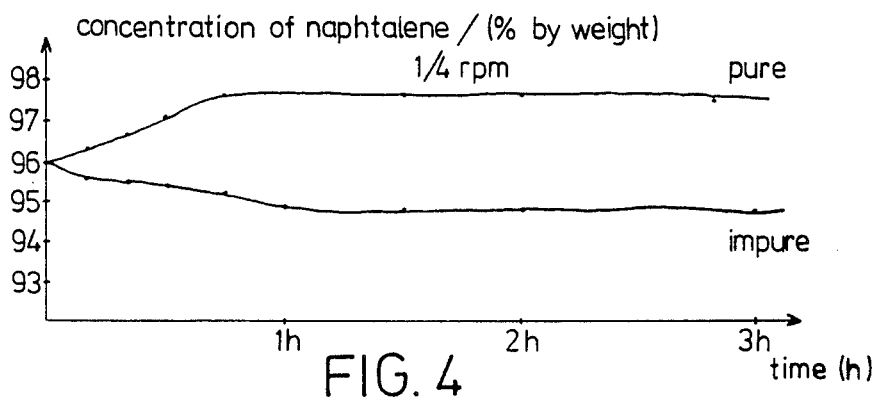
FIG. 4 is a graphical illustration of the separation of a naphthalene/$\beta$-methylnaphthalene mixture according to the present invention over time at $\frac{1}{4}$ r.p.m. speed of rotation.
Figure 5:
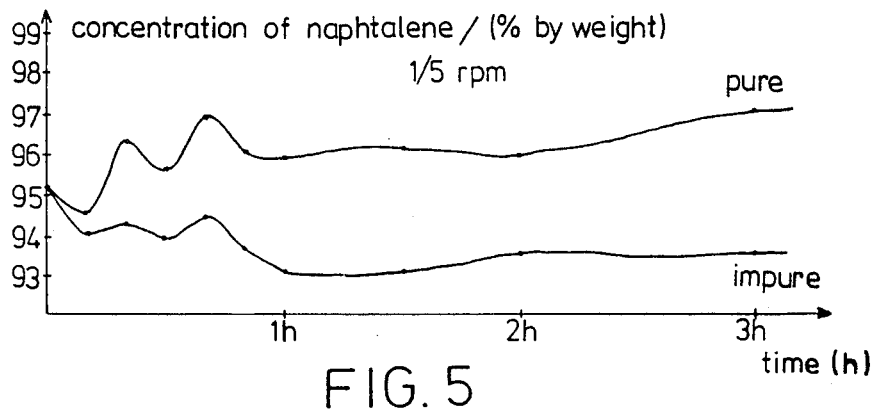
FIG. 5 is also a graphical illustration of the separation of a naphthalene/$\beta$-methylnaphthalene mixture according to the present invention over time at 1/5 r.p.m. speed of rotation.

Influence of time upon the results of purification in separation of the naphthalene/$\beta$-methylnaphthalene mixture has been illustrated in FIGS. 4 and 5, at respective speeds of rotation of ¼ r.p.m. and 1/5 r.p.m. The entry temperature of the cooling liquid was 54° C., and the exit temperature of the cooling liquid was 58°-60° C. The temperature of the melt was 90° C. with the surface temperature of the melter body being 120°-130° C. FIGS. 4 and 5 reveal that separation attains a constant level after a period of about one hour.

Certain of the preferred embodiments of the present invention have been presented in the foregoing. It is clear to one of skill in the art that numerous modifications thereof are feasible within the scope of the present invention. Accordingly, the preceeding description of the present invention is merely exemplary, and is not intended to limit the scope thereof in any way.

What is claimed is:

1. Method for separating or purifying a substance from a molten mixture by crystallization, comprising
   introducing the molten mixture into an annular space defined by two substantially curvilinearly-shaped surfaces, one of said surfaces being cooled and at least said cooled surface being rotated in a given direction, whereby said molten mixture is cooled on said cooled surface as the same flows through said annular space, and material continuously crystallizes to form a deposit on said cooled, rotating surface,
   causing said crystallized deposit to be contacted by a source of heat in a region downstream from where the molten material is introduced, thus melting said deposit at said downstream region,
   removing at least part of said melted deposit from said annular space at said downstream region, thus obtaining said substance in purified form,
   conducting any remaining part of said melted deposit through said annular space away from said source of heat in a direction opposite said given direction, and removing molten non-crystallized material which contains impurities from said annular space in a region spaced from said downstream region, wherein, said surfaces defining said annular space are substantially cylindrically-shaped and, said molten impurities are removed from said annular space at a point upstream of said introduction point.

2. The method of claim 1 wherein said rotating surface is cooled by directing a cooling fluid along a side of said rotating surface opposite a side thereof upon which said deposit crystallizes, from a point close to the removal point of said melted deposit to a point close to the removal point of said molten impurities.

3. The method of claim 1, additionally comprising preventing any flow of molten material between said two removal points both in said given direction and a direction from the removal point of the impurities to the removal point of melted deposit which bypass said introduction point.

4. The method of claim 3, wherein said flow of the molten material is prevented by disposing a barrier in said annular space between said two removal points.

5. The method of claim 1, wherein said cooled surface rotates about a substantially vertical axis.

6. Method for separating or purifying a substance from a molten mixture by crystallization, comprising introducing the molten mixture into an annular space defined by two substantially curvilinearly-shaped surfaces, one of said surfaces being cooled and at least said cooled surface being rotated in a given direction, whereby said molten mixture is cooled on said cooled surface as the same flows through said annular space, and material continuously crystallizes to form a deposit on said cooled, rotating surface, causing said crystallized deposit to be contacted by a source of heat in a region downstream from where the molten material is introduced, thus melting said deposit at said downstream region, removing at least part of said melted deposit from said annular space at said downstream region, thus obtaining said substance in purified form, conducting any remaining part of said melted deposit through said annular space away from said source of heat in a direction opposite said given direction, and removing molten non-crystallized material which contains impurities from said annular space in a region spaced from said downstream region.

wherein said cooled surface rotates with respect to said other surface.

7. The method of claim 6, wherein said rotating annular surface forms an outer surface of said annular space with crystallization of said deposit taking place on an inner side of said rotating surface.

8. The method of claim 6, wherein said rotating annular surface forms an inner surface of said annular space, with crystallization of said deposit taking place on an outer side of said rotating surface.

9. Method for separating or purifying a substance from a molten mixture by crystallization, comprising introducing the molten mixture into an annular space defined by two substantially curvilinearly-shaped surfaces, one of said surfaces being cooled and said cooled surface being rotated in a given direction, whereby said molten mixture is cooled on said cooled surface as the same flows through said annular space, and material continuously crystallizes to form a deposit on said cooled, rotating surface, causing said crystallized deposit to be contacted by a source of heat in a region downstream from where the molten material is introduced, thus melting said deposit at said downstream region, removing at least a part of said melted deposit from said annular space at said downstream region, thus obtaining said substance in purified form, conducting any remaining part of said melted deposit through said annular space away from said source of heat in a direction opposite said given direction, and removing molten non-crystallized material which contains impurities from said annular space in a region spaced from said downstream region and at a point upstream of said introduction point.

10. The method of claim 9 additionally comprising recycling at least a portion of said removed non-crystallized molten material back into said annular space.

11. The method of claim 10 wherein said recycled molten material is conducted back to said molten mixture prior to introduction of the same into said annular space.

12. Apparatus for separating or purifying a substance by crystallization from a molten mixture, comprising a first curvilinearly-shaped surface being cooled, a second curvilinearly-shaped surface, at least said cooled surface adapted to rotate in a given direction, an annular space defined between said two surfaces, first means for introducing the molten mixture to be separated or purified into said annular space, second means for cooling said first surface whereby material continuously crystallizes as a deposit upon said cooled surface, a source of heat for melting the crystallized deposit in a region downstream from said first means, third means for removing at least a portion of the melted deposit from said annular space at said downstream region, thus obtaining the substance in purified form, fourth means for directing any non-removed, melted deposit through said annular space away from said heat source in a direction opposite said given direction, and fifth means for removing molten non-crystallized material which contains impurities from within said annular space in a region spaced from said downstream region.

13. The apparatus of claim 12, wherein said first surface is disposed to rotate about a substantially vertical axis.

14. The apparatus of claim 12, wherein said fifth means additionally constitute means for recycling at least a portion of the removed non-crystallized molten material back into said annular space.

15. The apparatus of claim 12, wherein said first and second surfaces are substantially cylindrically-shaped, said second means constitute means for introducing a cooling fluid on a side of said first surface opposite a side upon which the deposit crystallizes, and said fifth means are disposed upstream of said first means.

16. The apparatus of claim 15, wherein said first surface being disposed to rotate eccentrically with respect to said second surface.

17. The apparatus of claim 15, additionally comprising
sixth means for preventing any flow of molten material between said third and fifth means both in said given direction and in a direction from said fifth means to said third means which bypass said first means.

18. The apparatus of claim 17 wherein said sixth means are constituted by a barrier disposed in said annular space.

19. The apparatus of claim 15, wherein said first surface constitutes an outer surface of said annular space, and
said second surface constitutes an inner surface of said annular space.

20. The apparatus of claim 15 wherein said first surface constitutes an inner surface of said annular space, and
said second surface constitutes an outer surface of said annular space.

21. The apparatus of claim 15, additionally comprising a third surface disposed on a side of said first surface opposite said second surface, and disposed at a discrete distance therefrom,
a second annular space defined between said first and third surfaces,
wherein said first means constitute means for introducing the molten mixture into both said annular spaces, whereby the material to be separated crystallizes upon both sides of said first surface,
said source of heat being adapted to melt the crystallized deposit on both sides of said first surface,
said third means constitute means for removing at least a portion of the melted deposit from both said annular spaces, and
said fifth means constitute means for removing the molten non-crystallized material from both said annular spaces.

22. The apparatus of claim 21, wherein
said fifth means additionally constitute means for recycling at least a portion of the removed non-crystallized molten material back to both said annular spaces,
said fourth means constitute means for directing any nonremoved, melted deposit through both said annular spaces in a direction opposite said given direction, and
additionally comprising
sixth means for preventing any flow of molten material between said third and fifth means in said respective annular spaces both in said given direction and in a direction from said fifth means to said third means which bypass said first means.

23. The apparatus of claim 22, wherein said first surface is substantially hollow, and
said second means constitute means for introducing a cooling fluid into said hollow surface, between said two annular spaces.

24. The apparatus of claim 15, wherein said first surface being disposed to rotate substantially concentrically with respect to said second surface.

25. The apparatus of claim 12, wherein said cooled surface is adapted to rotate with respect to said second surface.

* * * * *